US012606482B2

(12) United States Patent
Thomson et al.

(10) Patent No.: US 12,606,482 B2
(45) Date of Patent: Apr. 21, 2026

(54) METHOD OF FABRICATING AN OPTICAL FIBRE PREFORM

(71) Applicant: Heriot-Watt University, Edinburgh (GB)

(72) Inventors: Robert R Thomson, Edinburgh (GB); Calum Ross, Edinburgh (GB)

(73) Assignee: Heriot-Watt University, Edinburgh (GB)

( * ) Notice: Subject to any disclaimer, the term of this patent is extended or adjusted under 35 U.S.C. 154(b) by 691 days.

(21) Appl. No.: 17/910,762

(22) PCT Filed: Mar. 10, 2021

(86) PCT No.: PCT/EP2021/055997
§ 371 (c)(1),
(2) Date: Sep. 9, 2022

(87) PCT Pub. No.: WO2021/180763
PCT Pub. Date: Sep. 16, 2021

(65) Prior Publication Data
US 2023/0122602 A1     Apr. 20, 2023

(30) Foreign Application Priority Data

Mar. 10, 2020     (GB) ...................................... 2003468

(51) Int. Cl.
*C03B 37/012*     (2006.01)
*C03C 25/6208*     (2018.01)
*C03C 25/68*     (2006.01)

(52) U.S. Cl.
CPC ........ *C03C 25/68* (2013.01); *C03B 37/01205* (2013.01); *C03C 25/6208* (2018.01)

(58) Field of Classification Search
CPC ............................................... C03B 37/01208
See application file for complete search history.

(56) References Cited

U.S. PATENT DOCUMENTS 4,049,413 A     9/1977   French
6,418,258 B1 *  7/2002   Wang ................. G02B 6/02376
                                          385/124

(Continued)

FOREIGN PATENT DOCUMENTS

CN         104536092 A     4/2015
WO          0196919 A1    12/2001

(Continued)

OTHER PUBLICATIONS

Foreign Communication from a Related Counterpart Application, International Search Report and Written Opinion dated Aug. 18, 2021, International Application No. PCT/EP2021/055997 filed on Mar. 10, 2021.

(Continued)

*Primary Examiner* — Erin Snelting
(74) *Attorney, Agent, or Firm* — Conley Rose, P.C.

(57)                 ABSTRACT

A method of fabricating an optical fibre preform is disclosed comprising using a subtractive process on an optical monolith to define therein at least a transverse section of the optical fibre preform, wherein the transverse section comprises at least two regions with different refractive indexes. An optical fibre preform fabricated in accordance with the method is also disclosed along with a method of assembling optical components using a subtractive process to define a first interconnecting feature in or for use with a first optical component; using a subtractive process to define a second interconnecting feature in or for use with a second optical component; and coupling the first and second components together using the first and second interconnecting features such that the coupling dictates a passive alignment of the first and second components.

7 Claims, 6 Drawing Sheets

(56)                     References Cited

U.S. PATENT DOCUMENTS

| | | | | |
|---|---|---|---|---|
| 6,925,840 | B2 * | 8/2005 | Hawtof | .............. G02B 6/02366 |
| | | | | 385/124 |
| 2004/0179796 | A1 | 9/2004 | Jakobsen et al. | |
| 2017/0233283 | A1 | 8/2017 | Ashrafi | |
| 2018/0179106 | A1 | 6/2018 | Schowengerdt et al. | |

FOREIGN PATENT DOCUMENTS

| | | | |
|---|---|---|---|
| WO | 2006090002 | A1 | 8/2006 |
| WO | 2020025952 | A1 | 2/2020 |
| WO | 2021180763 | A1 | 9/2021 |

OTHER PUBLICATIONS

Foreign Communication from a Related Counterpart Application, International Preliminary Report on Patentability dated Sep. 22, 2022, International Application No. PCT/EP2021/055997 filed on Mar. 10, 2021.

Foreign Communication from a Related Counterpart Application, Search Report dated Sep. 7, 2021, United Kingdom Application No. GB2003468.2 filed on Mar. 10, 2020.

Foreign Communication from a Related Counterpart Application, Chinese Second Notice of Re-examination dated Oct. 20, 2025, Chinese Application No. 202180020369.7 filed on Mar. 10, 2021.

Foreign Communication from a Related Counterpart Application, Chinese Notice of Re-examination dated Jun. 3, 2025, Chinese Application No. 202180020369.7 filed on Mar. 10, 2021.

\* cited by examiner

100

102

200 collet
204 stepper
motor preform rod
100

Variac

Chamber
206

Feed
speed

202

Take up
speed

Speed Down
System

Force
Sensor

F spool
208 a)

500

502

504

506 b)

510

514

512 c)

510

500

520 d)

500

510

520 e)

500

510

514

900

902

904

900

902

900

904

METHOD OF FABRICATING AN OPTICAL FIBRE PREFORM

CROSS-REFERENCE TO RELATED APPLICATIONS

The present application is a filing under 35 U.S.C. 371 as the National Stage of International Application No. PCT/EP2021/055997, filed Mar. 10, 2021, entitled "Method of Fabricating an Optical Fibre Preform," which claims priority to United Kingdom Application No. 2003468.2 filed with the Intellectual Property Office of United Kingdom on Mar. 10, 2020, both of which are incorporated herein by reference in their entirety for all purposes.

TECHNICAL FIELD OF THE DISCLOSURE

The disclosure relates to a method of fabricating an optical fibre preform and a method of assembling optical components such as optical fibre preforms.

BACKGROUND OF THE DISCLOSURE

Traditional optical fibres are fabricated from a solid glass preform with doped and undoped regions that form a core and cladding regions in the optical fibre.

Microstructured optical fibres (MOF) are commonly fabricated from a preform that is made from a bundle of rods and capillaries of one or more material, but which are physically arranged in such a way that the final fibre includes substantial regions of air. One example of such a fibre is a hollow core optical fibre, where light is guided in a region of the fibre where there is no glass. MOF's include photonic crystal fibre, hollow-core fibre, negative curvature and anti-resonant fibre and some of these terms are often used interchangeably.

Such fibres are attracting huge attention for a variety of applications, including telecommunications, fibre lasers and high-power laser delivery for advanced manufacturing, high power transmission, non-linear photonics and spectroscopy amongst others. In some cases, MOF's can exhibit a multitude of advantages over conventional optical fibres including lower propagation loss, higher damage threshold, and wider spectral bandwidth.

Currently, MOF's are fabricated using labour intensive "stack and draw" techniques, where glass capillaries or rods are precisely stacked side by side to create a preform that is then heated and drawn to create the fibre. An example of a stacked MOF preform 100 is shown in FIG. 1, which comprises a hexagonal array of closely, but non-uniformly, packed glass rods 102. In practice, the preform is anything from ~10 cm long by 10 mm wide to multiple meters long by tens of centimeters wide, for example, ~50 cm long by 10 mm wide. FIG. 2 shows an apparatus 200 being used to draw such a preform 100 from a relatively short and wide structure into a long and thin fibre 202. The preform 100 is held at a top end by a collet 204, with its lower end being positioned within a heat chamber or furnace 206. As the lower end of the preform 100 is melted a thin fibre 202 is drawn downwardly and wound around a spool 208.

The "stack and draw" technique is extremely time consuming, labour intensive, and requires highly skilled personnel making such MOFs expensive to manufacture and wherein a high degree of reproducibility is challenging. In addition, fibres can only be produced in a restricted number of preform patterns and so many MOF core designs that are desirable for applications and industry cannot be manufactured.

However, there is currently a huge amount of interest in developing hollow core pure fused silica fibres for applications including low-latency fibre links in data centres and power delivery fibres for high peak power laser delivery. There is therefore a desire to reduce costs such that MOF's can be exploited more readily.

Some work has been done using 3D printing techniques to make glass preforms for optical fibre fabrication, such as that described in "Silica optical fibre drawn from 3D printed preforms" Opt. Lett. 44, 5358-5361 (2019); Yushi Chu et al. This fabrication process is based on ultraviolet (UV) curing of silica nanoparticles suspended in a resin. However, the material finish is generally poor and, as a result, core features are not well defined. The resulting glass is therefore of low quality due to the presence of defects and impurities.

It is therefore an aim of the present disclosure to provide a method of fabricating an optical fibre preform that address one or more of the problems above or at least provides a useful alternative.

SUMMARY

In general, this disclosure proposes to overcome the above problems by fabricating optical fibre preforms using a subtractive technique, such as laser assisted etching, to directly define a core structure in a high-purity fused silica substrate. Thus, enabling a highly automated process which facilitates complete control over the core structure.

According to one aspect of the present disclosure, there is provided a method of fabricating an optical fibre preform comprising:

using a subtractive process on an optical monolith to define therein at least a transverse section of the optical fibre preform; and wherein the transverse section comprises at least two regions with different refractive indexes.

Thus, embodiments of this disclosure provide a method fabricating an optical fibre preform using a subtractive process to define at least a transverse section of the optical fibre preform from an optical monolith. Thus, enabling a potentially faster, more accurate and repeatable process for fabricating an optical fibre preform which can then be drawn using traditional techniques to realise low cost (potentially hollow core) optical fibres. Advantageously, the method may allow for arbitrary shaped holes and regions to be removed from each transverse section, enabling the manufacture of optical fibre that is not possible using previous techniques.

The subtractive process may comprise laser assisted etching (LAE), which may comprise laser writing a structure in the optical monolith and chemical etching the structure to obtain the transverse section. In other words, the optical monolith may be inscribed in three-dimensions using short (e.g. picosecond, femtosecond or nanosecond) laser pulses, which may penetrate a few mm into the material, before the inscribed (i.e. laser-written) material is removed by selective chemical etching. The result is a slab of shaped optical material that forms a transverse section or slice of the preform. Such laser-based fabrication (sometimes referred to as laser printing or laser inscription) may be performed by an ultrafast pulsed laser. Advantageously, in some embodiments, it may be possible to fabricate a 200 mm long preform in 1 or more days as opposed to weeks using traditional techniques. Thus, embodiments of the invention may transform the commercial potential and applications of such microstructured optical fibres.

The transverse section may be defined by a laser beam oriented perpendicularly to a plane of the transverse section. In some embodiments, the transverse section may be defined by a laser beam oriented parallel to a plane of the transverse section.

The optical monolith (i.e. substrate, wafer or blank) may comprise any suitable material from which to produce an optical fibre. In particular, the optical monolith may comprise high quality (ultrapure) fused silica glass for the fabrication of optical fibres of outstanding quality.

The transverse section may comprise a structured core and/or a hollow core.

The method may comprise:

using the subtractive process to define at least two transverse sections of the optical fibre preform; and stacking the at least two transverse sections to form a stacked optical fibre preform.

Although a preform could be created in its entirety using embodiments of the invention, higher accuracy may be obtained by fabricating multiple discrete transverse sections (i.e. slabs) and then stacking them end-to-end to form the optical fibre preform.

One might think that a preform fabricated using the proposed technique will suffer due to the discrete nature of the laser-written slabs from which the preform is constructed. However, this is not the case as the subsequent optical fibre drawing process involves heating the preform to >1500 degrees Celsius, during which a boundary region between the transverse sections becomes fully melted and disappears due to surface tension.

The method may further comprise coupling the at least two transverse sections to form the stacked optical fibre preform.

The coupling may dictate a passive alignment of the at least two transverse sections. This is advantageous to ensure that a desired longitudinal optical path through the preform is achieved with minimal (or no) manual input or skill being required.

The coupling may be achieved using at least one interconnecting feature defined in at least one of the at least two transverse sections.

The at least one interconnecting feature in the at least one transverse section may be configured for direct or indirect coupling to another transverse section.

The at least one interconnecting feature may be configured for coupling using one or more of: a pin, a dowel, a sphere, a dove tail joint, a threaded portion, a ring, a plug and socket arrangement, a self-centring locator.

The method may further comprise bonding the at least two transverse sections in the stacked optical fibre preform.

The bonding may comprise one or more of: catalysis bonding; ultrafast laser bonding; optical contact bonding; or laser welding (e.g. $CO_2$ laser welding).

Commonly, each transverse section for a particular preform would be identical. However, the same process could also be used to make a preform with a pattern which varies along its length to therefore produce a fibre with a varying core structure along its length.

Accordingly. the optical fibre preform may be fabricated with a longitudinally varying core structure.

The optical fibre preform may be formed from two or more transverse sections having different core structures.

According to a second aspect of the disclosure there is provided a transverse section of an optical fibre preform, fabricated in accordance with the first aspect.

According to a third aspect of the disclosure there is provided an optical fibre preform fabricated in accordance with the first aspect.

According to a fourth aspect of the disclosure there is provided an optical fibre fabricated from the optical fibre preform of the third aspect.

Optical fibres manufactured from preforms fabricated in accordance with the first aspect of the invention may have many applications including high speed low latency data communications, laser manufacturing, sensing, advanced telecommunications, spectroscopy, biomedical photonics and high power laser delivery amongst others.

According to a fifth aspect of the disclosure there is provided a method of assembling optical components comprising:

using a subtractive process to define a first interconnecting feature in or for use with a first optical component;

using a subtractive process to define a second interconnecting feature in or for use with a second optical component; and coupling the first and second components together using the first and second interconnecting features such that the coupling dictates a passive alignment of the first and second components.

Embodiments of this aspect of the invention are advantageous in that passive alignment of two optical components can be guaranteed by provision of interconnecting features inscribed in or for use with each of the components.

The first and second interconnecting features may be configured for direct or indirect coupling.

The first and/or second interconnecting features may be configured for coupling using one or more of: a pin, a dowel, a sphere, a (sliding) dove tail joint, a threaded portion, a ring, a plug and socket arrangement, a self-centring (e.g. conical) locator.

The method of the fifth aspect may further comprise bonding the first and second optical components together once coupled.

The bonding may comprise one or more of: catalysis bonding; ultrafast laser bonding; optical contact bonding; or laser welding (e.g. $CO_2$ laser welding).

The method may further comprise fabricating at least one of the first and second optical components using the subtractive process.

At least one of the first and second optical components may comprise: an optical substrate; an image slicer (e.g. a Bowen image slicer); or at least a transverse section of an optical fibre preform.

According to a sixth aspect of the disclosure there is provided an optical apparatus comprising optical components assembled in accordance with the fifth aspect.

BRIEF DESCRIPTION OF THE PREFERRED EMBODIMENTS

Some embodiments of the disclosure will now be described by way of example only and with reference to the accompanying drawings, in which.

DETAILED DESCRIPTION OF THE PREFERRED EMBODIMENTS

Generally speaking, the disclosure provides a method of fabricating an optical fibre preform and a method of assembling optical components, such as, but not limited to said optical fibre preforms. The disclosure also provides for the manufacture of small scale glass preforms that can then be tapered on a fibre tapering rig.

Figure 1:
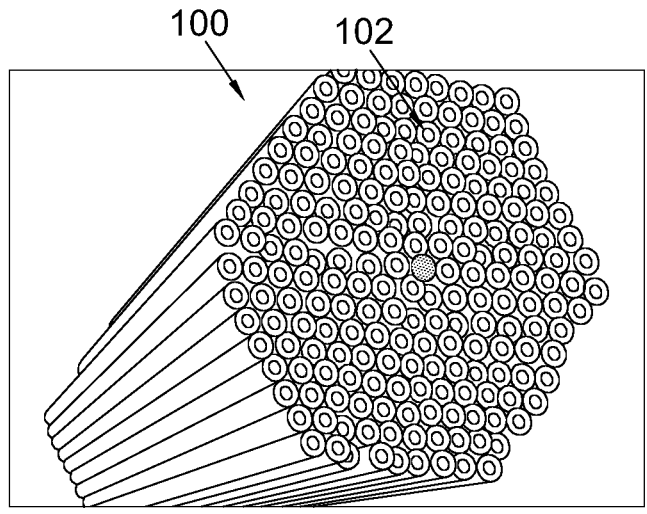
FIG. 1 shows an optical fibre preform in accordance with the prior art.
Figure 2:
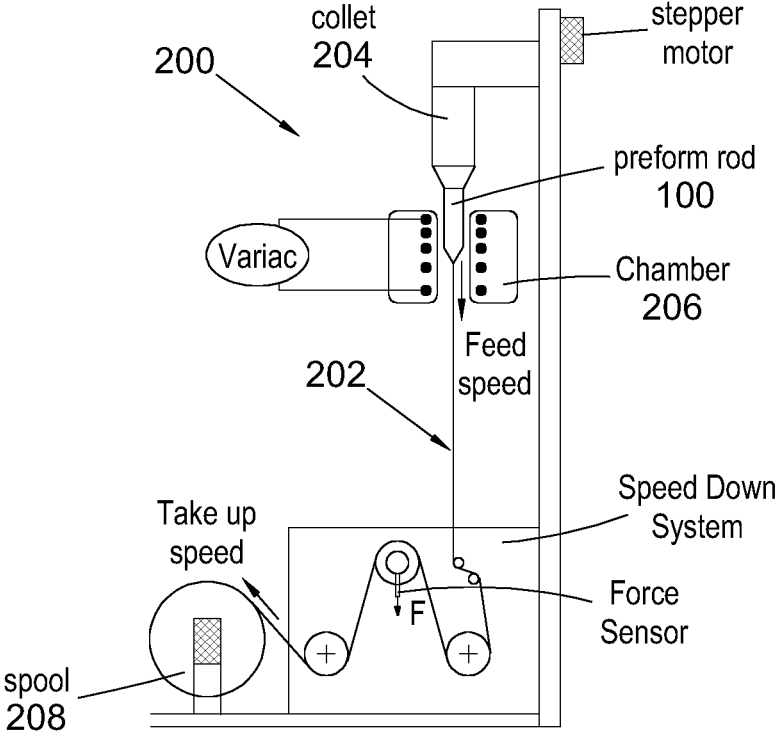
FIG. 2 shows apparatus for drawing an optical fibre from an optical fibre preform in accordance with the prior art.
Figure 3:
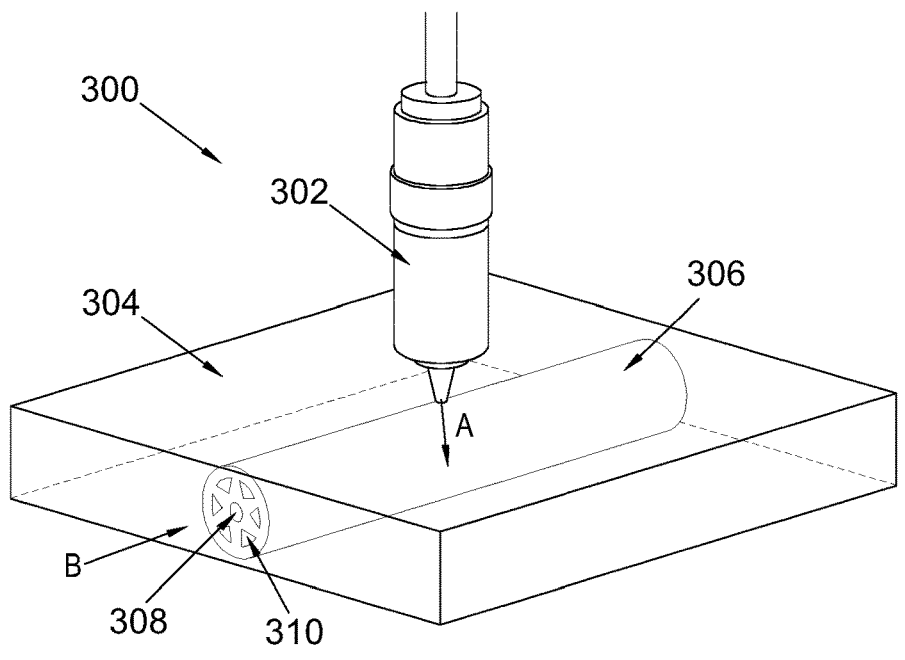
FIG. 3 shows apparatus for fabricating an optical fibre preform in accordance with the present disclosure.

In particular, FIG. 3 shows an apparatus 300 for fabricating an optical fibre preform in accordance with the proposed method. Thus, the apparatus comprises an ultrafast pulsed laser 302 configured for use in a subtractive laser assisted etching process performed on an optical monolith 304, which is in the form of a cuboidal slab of fused silica. The laser 302 is configured to define at least a transverse section 306 of an optical fibre preform by laser writing a pre-defined three-dimensional pattern in the optical monolith 304. As shown, the laser 302 is oriented to direct a laser beam in a direction A which is parallel to a plane of the transverse section 306. In other embodiments, the laser 302 may be oriented to direct the laser beam in a direction B which is perpendicular to a plane of the transverse section 306. After the desired pattern is laser inscribed into the optical monolith 304, a wet chemical etching process is used to selectively remove the inscribed material and free the transverse section 306 from the optical monolith 304. This technique is known as ultrafast laser assisted etching (ULAE) and enables the removal of silica or other material from a substrate in three-dimensions with micrometre-scale precision. Further details of the proposed technique can be found in C. A. Ross, D. G. MacLachlan, D. Choudhury, and R. R. Thomson, "Optimisation of ultrafast laser assisted etching in fused silica," Opt. Express 26 (19), 24343 (2018), which is incorporated herein by reference.

The transverse section 306 comprises at least two regions with different refractive indexes. In particular, the transverse section 306 as shown has a hollow core 308 and six hollow segments 310 radially spaced from and surrounding the hollow core 308.

Although, the transverse section 306 is shown in FIG. 3 as elongated, in some embodiments much shorter transverse sections will be fabricated and subsequently stacked, aligned and bonded to form an optical fibre preform having a high degree of accuracy.

Figure 4A:
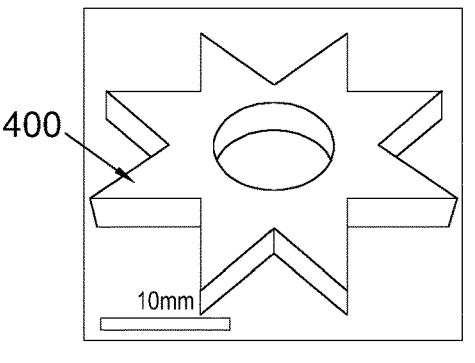
FIGS. 4A, 4B and 4C show examples of optical components fabricated using the apparatus of FIG. 3.
Figure 4B:
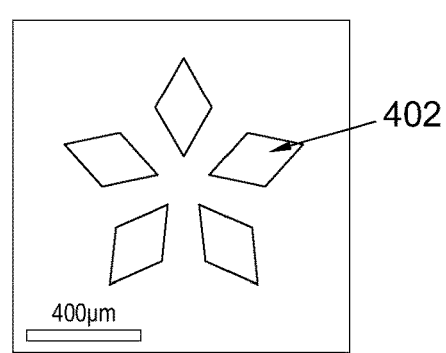
Figure 4C:
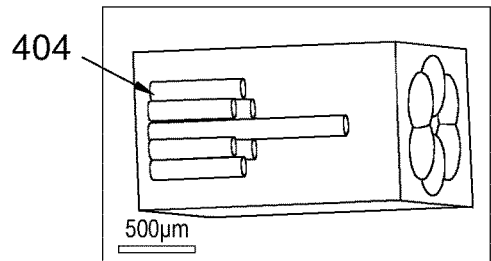

FIGS. 4A, 4B and 4C show examples of optical components fabricated using the apparatus of FIG. 3 and the method described above. In particular, FIG. 4A shows a star-shaped transverse section 400 with a hollow cylindrical core; FIG. 4B shows a transverse section having four diamond-shaped cut-outs 402; and FIG. 4C shows a preform comprising cylindrical portions of differing lengths 404. Notably, each of these optical components are of a scale suitable for embodiments of the invention.

FIGS. 5A through 5E illustrate a method of assembling optical components similar to those described above, to form an optical preform.

Figure 5:
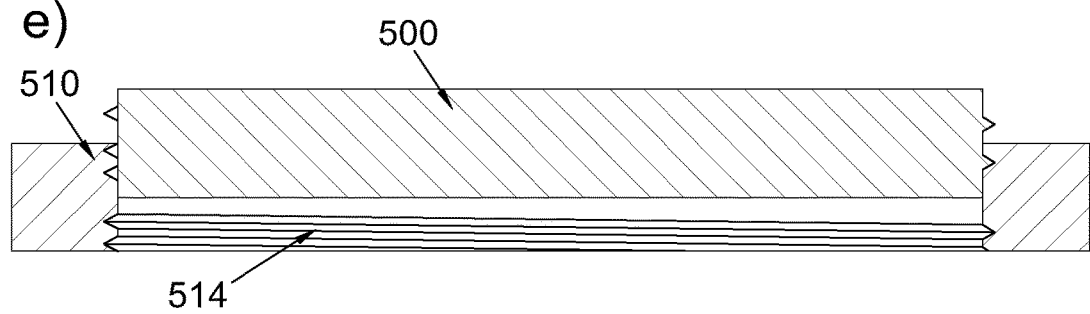
FIG. 5A shows a transverse section for an optical fibre preform in accordance with the present disclosure.
FIG. 5B shows an alignment ring for use in an embodiment of the disclosure.
FIG. 5C shows a stacked optical preform with a socket for receiving a further transverse section in accordance with an embodiment of the disclosure.
FIG. 5D shows a stacked optical preform similar to that of FIG. 5C but with a further transverse section screwed into the socket.
FIG. 5E shows a transverse cross-sectional view of the further transverse section and uppermost alignment ring from FIG. 5D.

In particular, FIG. 5A shows a transverse section 500 for an optical fibre preform in accordance with the present disclosure. The transverse section 500 is in the form of a disc having a preform pattern 502 having a hollow core 504 etched out of a centre of the disc and an upper and a lower external screw thread 506 formed by laser assisted etching on the outer circumference of the disc. FIG. 5B shows an alignment ring 510, laser etched from the same material as the transverse section 500, and into which two transverse sections 500 may be partially screwed.

The alignment ring 510 comprises an upper internal channel 512 for receipt of an upper external screw thread 506 of a transverse section 500 and a lower internal channel 514 for receipt of a lower external screw thread 506 of a transverse section 500.

FIG. 5C shows a stacked optical preform 520 with a socket for receiving a further transverse section 500 in accordance with an embodiment of the disclosure. The stacked optical preform 520 comprises multiple transverse sections 500 screwed into multiple alignment rings 510 in a stacked configuration to form a solid preform without air gaps. FIG. 5D shows the stacked optical preform 520 similar to that of FIG. 5C but with a further transverse section 500 screwed into the socket of the top alignment ring 512 such that the upper external screw thread 506 of the further transverse section 500 projects above the alignment ring 512 for screwing into a yet further alignment ring 512 and so on. FIG. 5E shows a transverse cross-sectional view of a transverse section 500 screwed into the upper internal channel 512 of an alignment ring 510, with the lower internal channel 514 of the alignment ring 510 awaiting insertion of a further transverse section 500.

Notably, each transverse section 500 has two separate 360 degree threads 506, allowing the transverse section 500 to be stacked indefinitely and coupled or locked together using complementary alignment rings 510. The pitch of the threads 506 is such that the individual transverse sections 500 contact one another within the alignment rings 510 upon a full 360 degree rotation and a thread terminator (not shown) prevents over-tightening—this ensures precise lateral, longitudinal and rotational alignment. The threads 506 also provide compressive pressure between transverse sections 500, which hold the preform 520 together ready for drawing.

The exposed upper and lower flat surfaces of the transverse sections 500 are optically polished and are not substantially altered from the original optical monolith of pristine silica which laser is written to form the individual transverse sections 500. As a result, optical contacting between the surfaces means that no further bonding is required. During drawing, any discontinuity of the structure at an interface between transverse sections 500 (or between the transverse sections 500 and the alignment rings 510) is annealed and drawn out over a large distance such that the individual transverse sections 500 (and alignment rings 510) are no longer distinguishable in the final fibre.

Figure 6:
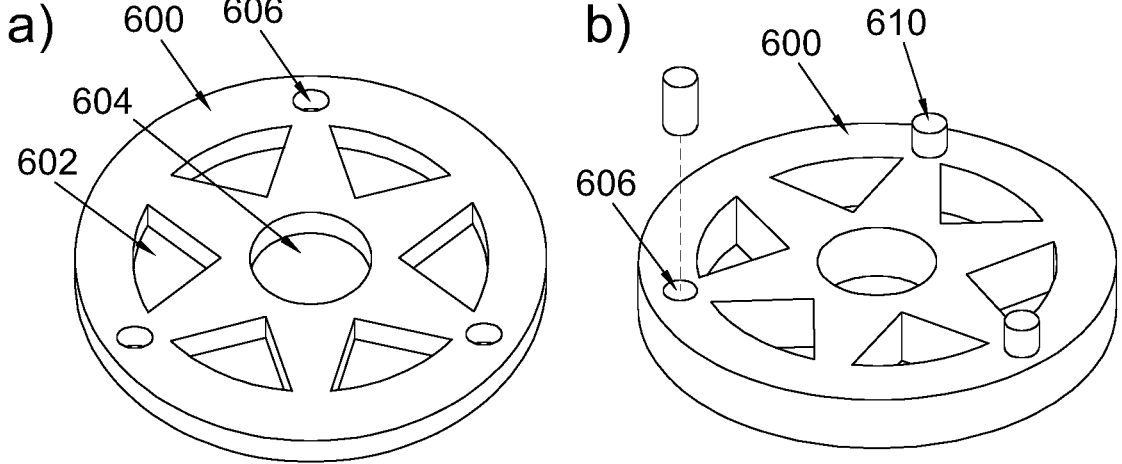
FIG. 6A shows a transverse section, including alignment holes, for an optical fibre preform in accordance with an embodiment.
FIG. 6B shows the transverse section of FIG. 6A with alignment dowels inserted in the alignment holes.

FIG. 6A shows another transverse section 600 in accordance with an embodiment, which is in the form of a disc having a preform pattern 602 and a hollow core 604 etched out of a centre of the disc. However, in this case, instead of external screw threads, three alignment holes 606 are laser etched (equally spaced apart) into a rim of the transverse section 600 and extend from the upper to lower flat surfaces of the transverse section 600. As shown in FIG. 6B, alignment dowels 610 (e.g. pins), etched from the same material as the transverse section 600, are inserted halfway into each of the alignment holes 606 such that the projecting halves serve to locate and align a further transverse section 600 placed on top and so on. In some embodiments, the alignment dowels 610 may be longer than the thickness of the transverse sections 600 such that a single alignment dowel may extend through multiple alignment holes 606 in multiple transverse sections 600 for ease of assembly.

Although the alignment holes 606 are shown as extended completely through each transverse section 600, in some embodiments, blind alignment holes may be provided to locate the alignment dowels 610 partway within each transverse section 600. However, in this case, separate alignment holes would need to be etched in both the upper and lower surfaces of each transverse section 600.

The alignment holes 606 and alignment dowels 610 serve to align the transverse section 600 both laterally and rotationally. An advantage of this method is that there is no need to fabricate a complex screw or alignment ring and so fabrication time is reduced. However, the alignment dowels 610 must be placed in the alignment holes 606 by hand or by a machine which increases the time for assembly and there may be an additional need to bond the surfaces together.

The transverse sections of silica may be bonded together using any of several "direct bonding" techniques that do not rely on any foreign substance, such as glue, which would remain as an impurity in the fibre after drawing. Here, direct bonding means any technique in which a chemical fusion of the silicate components takes place but also extends to optical contacting in which two extremely flat surfaces are held together purely by intermolecular forces. Although optical contacting may not result in a permanent bond immediately, the process of drawing the preform in a furnace results in a blending of the interface which does result in a permanent and indistinguishable bond. During optical contacting, a small quantity of isopropanol or similar can be dropped onto the surface of one of the parts to allow for some alignment time before evaporation makes the parts immovable.

In the case that optical contacting is not sufficient, chemically activated direct bonding may be used. In the case of silica, hydroxide-catalysis bonding may be employed such as those described in detail in E. J. Elliffe, J. Bogenstahl, A. Deshpande, J. Hough, C. Killow, S. Reid, D. Robertson, S. Rowan, H. Ward, and G. Cagnoli, "Hydroxide-catalysis bonding for stable optical systems for space," in Classical and Quantum Gravity (2005), 22(10) and Anna-Maria A. van Veggel and Christian J Killow, "Hydroxide catalysis bonding for astronomical instruments", *Adv. Opt. Techn.* 2014; 3(3): 293-307. These documents describe the process of chemically activating one surface by producing dangling silicon bonds which preferentially attach to hydroxide molecules of the counterpart surface. The process works as follows: an alkaline solution such as potassium hydroxide is placed on one surface and the other surface is placed in contact. The OH— ions etch the silica surface liberating silicate ions. The released ions decrease the pH of the solution until dissociation occurs and siloxane polymer chains form. The chains create a strong bond between the surfaces and become ridged as a water by-product dehydrates.

Figure 7:
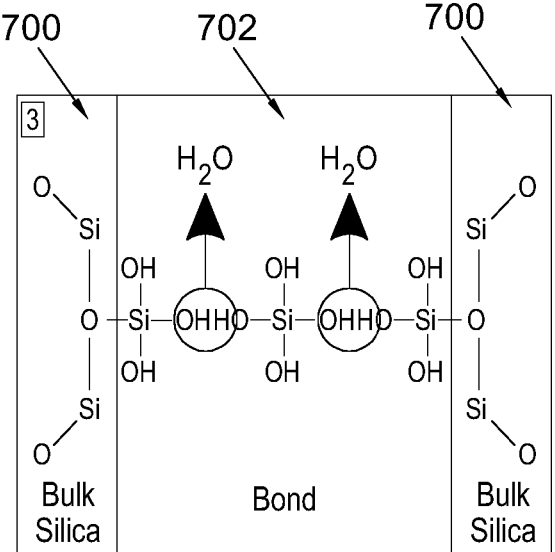
FIG. 7 shows possible chemical bonding between transverse sections in accordance with embodiments of the disclosure.

FIG. 7 illustrates such possible chemical bonding 702 between two bulk silica components 700, which may be transverse sections and/or alignment features, in accordance with embodiments of the disclosure.

Figure 8:
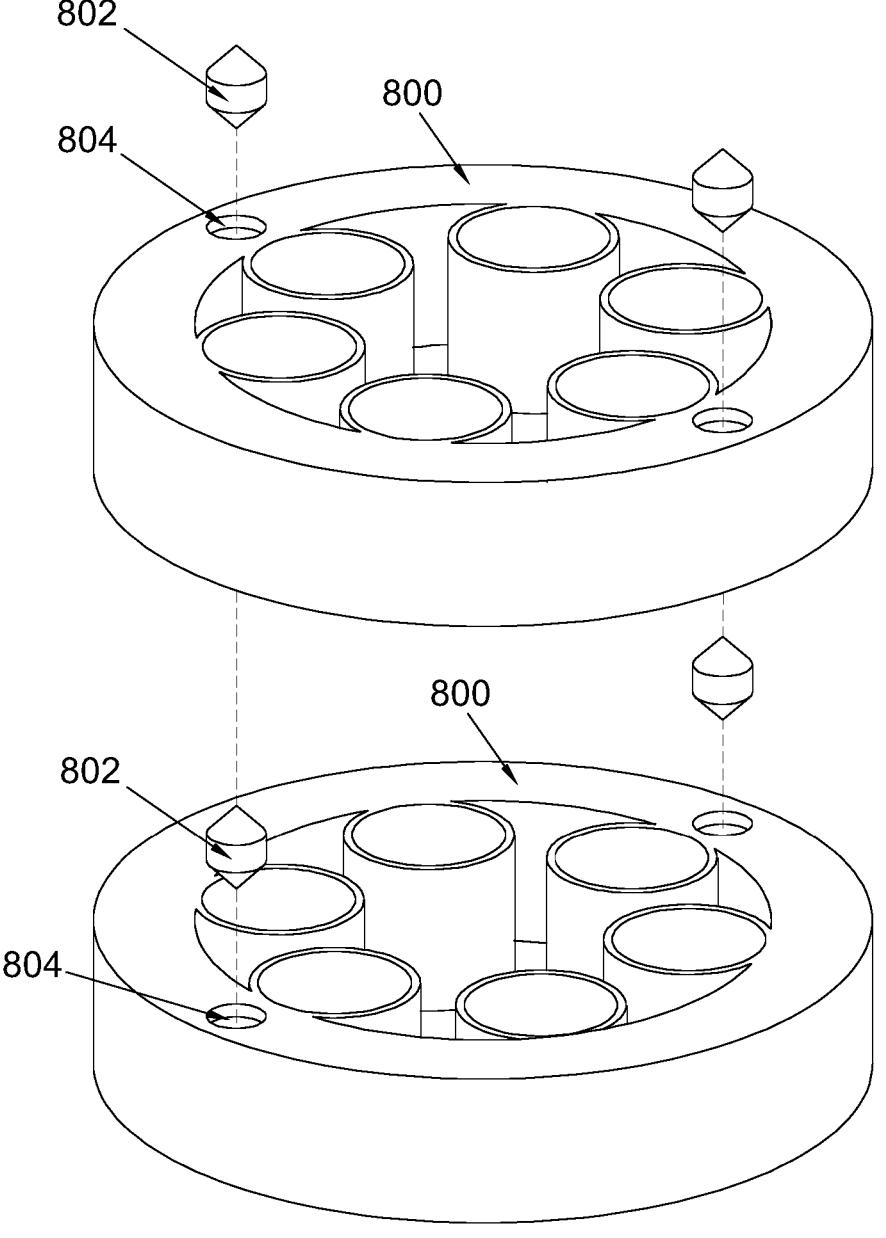
FIG. 8 shows two transverse sections with passive alignment achieved using self-centring conical pins in accordance with embodiments of the disclosure.

FIG. 8 shows two transverse sections 800 having structured cores and with passive alignment achieved using two self-centring conical pins 802, which are inserted into two corresponding conical recesses 804 in a rim of each surface of the transverse section 800, in accordance with embodiments of the disclosure. The conical pins 802 are similar to the dowels described above but have short cylindrical bodies with conical ends which are easier to insert and locate within each transverse section 800 due to their conical nature helping to guide the components into alignment. This may therefore speed up the process of assembling the optical preform and allow for automated assembly. Alternatively, micromachined fused silica spheres could be used instead of pins, further simplifying the assembly process since no pin orientation is required.

As illustrated in FIG. 8, the two conical recesses 804 in the lower surface of each transverse section 800 are offset by 90 degrees with respect to the two conical recesses 804 in the upper surface of each transverse section 800. This helps to prevent any interference or overlap between the conical recesses 804 in the upper surface and lower surface and allows the conical recesses 804 to each have a depth which is 50% or greater than the thickness of the transverse section 800 for secure coupling and interlocking. Notably, the offsetting of the alignment features in this embodiment is possible due to the symmetrical nature of the structured cores. This may not always be the case.

Figure 9A:
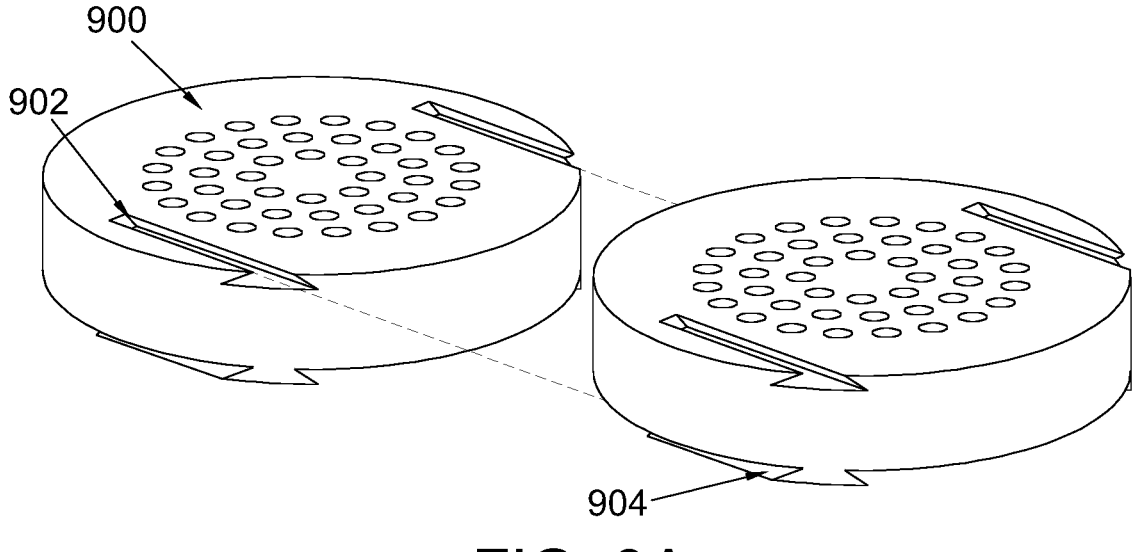
FIGS. 9A and 9B show two transverse sections with passive alignment achieved using sliding dovetail joints in accordance with embodiments of the disclosure.
Figure 9B:
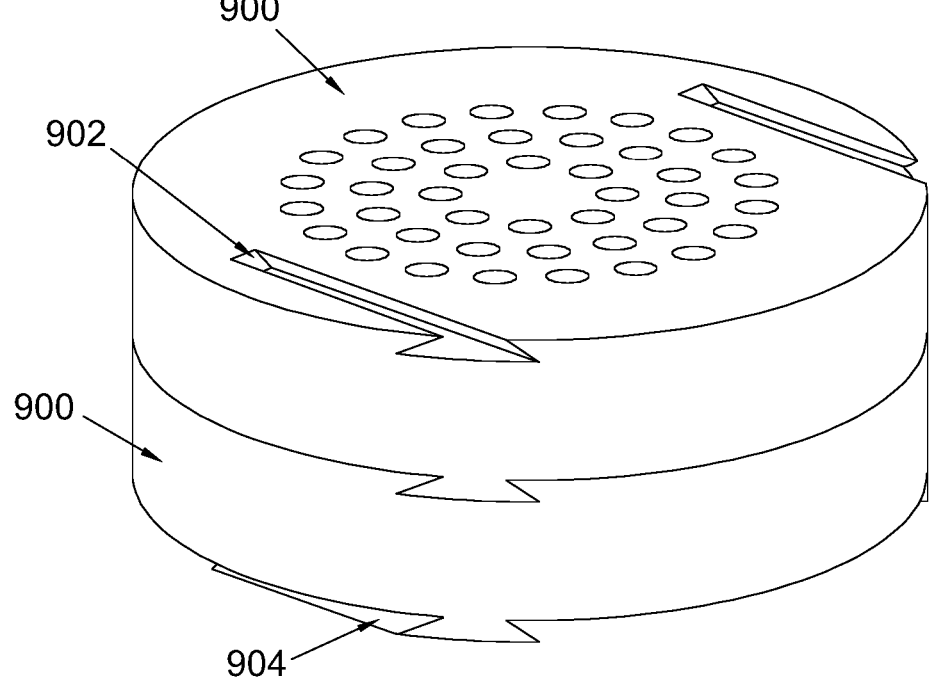

FIGS. 9A and 9B show two transverse sections 900 with passive alignment achieved using sliding dovetail joints in accordance with embodiments of the disclosure. The transverse sections 900 each comprise a structured core and two dovetail channels 902 in an upper surface with two corresponding dovetail projections 904 in a lower surface. The dovetail projections 904 on an upper transverse section 900 are configured to slide laterally into the dovetail channels 902 in a lower transverse section 900 to couple the two transverse sections 900 together in a predetermined alignment during assembly of the preform. In this case, direct bonding of the two transverse sections 900 may be by optical contacting or chemical bonding as described above. The dovetail channels may additionally be tapered such that the upper transverse section can be wedged into the lower transverse section.

In general, an aspect of the invention relates to a method of assembling optical components comprising: using a subtractive process (e.g. laser assisted etching) to define a first interconnecting feature in or for use with a first optical component; using a subtractive process (e.g. laser assisted etching) to define a second interconnecting feature in or for use with a second optical component; and coupling the first and second components together using the first and second interconnecting features such that the coupling dictates a passive alignment of the first and second components.

Although most of the drawings relate to the fabrication and alignment of transverse sections for optical preforms, it will be understood that aspects of the invention, such as that described above, are applicable more widely to any optical components. For example, macro-scale glass components (e.g. an image slicer or other components) may be manufactured by combining two or more individual components, which may themselves be fabricated using a subtractive process such as laser assisted etching. Furthermore, aspects of the invention extend to the alignment of optical micro-components on a glass "breadboard" or optical substrate which comprises laser written alignment and joining features as described above.

The various aspects of the invention have multiple advantages over the prior art, for example, in creating more accurate and pure optical fibre preforms and ensuring ease of alignment and coupling of optical components in general.

The skilled person will understand that in the preceding description and appended claims, positional terms such as 'upper', 'lower', 'top', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Although the disclosure has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in any embodiments, whether alone or in any appropriate combination with any other feature disclosed or illustrated herein.

The invention claimed is:

1. A method of fabricating an optical fibre preform comprising:
   using a subtractive process on an optical monolith to define therein at least two transverse sections of the optical fibre preform;
   stacking and coupling the at least two transverse sections to form a stacked optical fibre preform;
   wherein the at least two transverse sections comprise at least two regions with different refractive indexes;
   wherein the coupling dictates a passive alignment of the at least two transverse sections;
   wherein the optical fibre preform is formed from two or more transverse sections having different hollow core structures configured to form at least one continuous longitudinally varying hollow core structure; and
   wherein the subtractive process comprises laser assisted etching comprising laser writing a structure in the optical monolith and chemically etching the structure to obtain the at least two transverse sections.

2. The method according to claim 1 wherein at least one of the transverse sections comprises a structured core.

3. The method according to claim 1 wherein the coupling is achieved using at least one interconnecting feature defined in at least one of the at least two transverse sections.

4. The method according to claim 3 wherein the at least one interconnecting feature in the at least one transverse section is configured for direct or indirect coupling to another transverse section.

5. The method according to claim 3 wherein the at least one interconnecting feature is configured for coupling using one or more of: a pin, a dowel, a sphere, a dove tail joint, a threaded portion, a ring, a plug and socket arrangement, or a self-centering locator.

6. The method according to claim 1 further comprising bonding the at least two transverse sections in the stacked optical fibre preform.

7. The method according to claim 6 wherein the bonding comprises one or more of: catalysis bonding; ultrafast laser bonding; optical contact bonding; or laser welding.

* * * * *